Jan. 2, 1940.   E. A. LARSSON   2,185,257

CURRENT COLLECTOR

Filed Jan. 25, 1939

Inventor

ERNST A. LARSSON

By

Attorney

Patented Jan. 2, 1940

2,185,257

UNITED STATES PATENT OFFICE 2,185,257

CURRENT COLLECTOR

Ernst A. Larsson, Mansfield, Ohio, assignor to The Ohio Brass Company, Mansfield, Ohio, a corporation of New Jersey Application January 25, 1939, Serial No. 252,800

12 Claims. (Cl. 191—59.1)

My invention relates to a device for gathering current from a trolley wire and has particular use in connection with trolley buses and other electrically operated vehicles.

One object of my invention is to provide a shoe having an insert which may be renewed from time to time as wear of the insert may require.

Another object of my invention is to provide a one piece insert-holder having means whereby the holder may be made to grip or release the insert.

Another object is to provide an adjustable one piece holder for an insert in which the wear upon the holder due to contact with the trolley wire after the insert has been worn through, is materially reduced.

I secure these and other objects by the means hereinafter disclosed and illustrated in the accompanying drawing in which.

Figure 2:
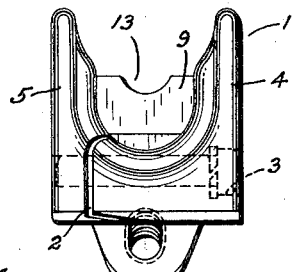
Fig. 2 is an end view of Fig. 1 looking toward the left-hand end of Fig. 1.
Figure 1:
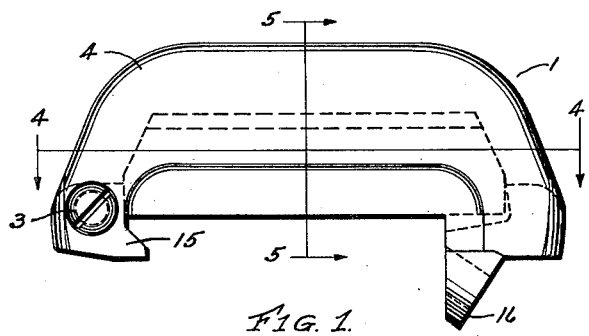
Fig. 1 is a side view in elevation of my invention.

In the current collector or shoe shown in my Letters Patent 2,044,886, of June 23, 1936, I disclose a holder or frame of one piece and the insert is placed in position by insertion through a bottom opening in the holder. This construction is quite satisfactory when the insert is of metal and especially when held in position by a slight fusing of the parts as described.

When the insert is of carbon, however, or made of other non-metallic current conducting material it is not possible to fuse the insert to the holder therefore the contact between the holder and insert is not as efficient as when the insert is of metal and considerable heating is the result as the insert and holder often carry several hundred amperes for a considerable time.

Satisfactory operating current collectors are in use in which the metal holder is of four parts and the insert is of carbon, however there is as a rule an advantage in a device which provides as few parts as possible, and in the present case one in which the carbon insert is efficiently and renewably held.

I have, therefore, provided a current collector shoe in which a carbon insert may be used and renewed from time to time, the holder consisting of two parts, one part capable of being drawn into clamping engagement with the insert by means of the other part, thus securing an efficient contact between the holder and insert also providing a shoe in which the trolley wire is normally maintained out of contact with the holder thus reducing wear upon the side flanges of the holder and permitting use of the holder with a number of renewed inserts; also providing a shoe which in case of the insert being worn through, the trolley wire will contact in a substantial manner with the end portions of the shoe as hereinafter described.

In the preferred embodiment of my invention, I employ a one piece frame or holder 1 which is provided with a diagonal slot 2 at one end and a headed screw 3 adjacent the slotted end whereby the end of the frame 1 may be drawn toward each other.

The frame 1 comprises longitudinal side walls 4 and 5 and an end wall 6. The side walls 4 and 5 are provided at the slotted end with inwardly projecting portions 7 and 8 respectively.

The frame 1 is provided with an elongated recess in which is positioned an insert 9 which is preferably made of carbon or other non-metallic current conducting material which will act as a lubricant to the trolley wire, or the insert may be of a metal. The said recess is formed by the inner faces 10 and 11 respectively of the side walls 4 and 5 and the inner face 12 of the end wall 6 and the inner faces 5 projecting portions 7 and 8.

I prefer to make the width of the recess greater at some point intermediate the ends thereof as, for instance, at A than the width at the ends thereof, thus giving the side faces of the recess or the inner faces of the walls either longitudinally curved providing concave faces or straight faces tapering from the point of maximum width to the ends of the recesses. This gives not only a greater width to the insert which is made to conform to the shape of the recess but provides a material thickening of the insert in width at a point intermediate the ends thereof, preferably midway, thus materially strengthening the insert at a point where breakage is most liable to occur as the insert if made of carbon is quite frangible and subject to considerable abuse in passing across overhead switches, crossings, etc.

The insert is also provided with a top groove 13 which is of less width than that between the adjacent faces of the sides 4 and 5. This tends to center the trolley wire immediately upon the application of the shoe to the trolley wire and conditions being normal the groove in the insert will tend to wear quite uniformly with respect to the side faces of the frame thus avoiding contact between the trolley wire and the frame side faces.

It not infrequently happens that those in charge of equipment will inadvertently permit the insert to become entirely worn through before making a replacement in which case the trolley wire will engage in sliding relation with the upper surface of the end 6 and the projecting portions 7 and 8 and it is for this reason that I provide a diagonal slot in place of a longitudinal slot. When the slot is longitudinal, either at one end or at both ends (if a multipart frame is used) the trolley wire will ride in the slot and even though the slot might be quite narrow the contact would be that of the longitudinal edges of the slot with the trolley wire and therefore the wear upon the end of the frame and upon the trolley wire would be materially greater than that if no slot existed as at the end 6 of the frame.

Figure 3:
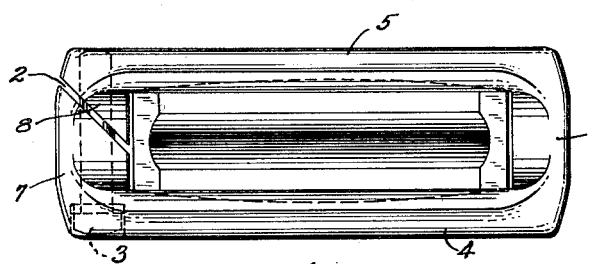
Fig. 3 is a top view of Fig. 1.
Figure 9:
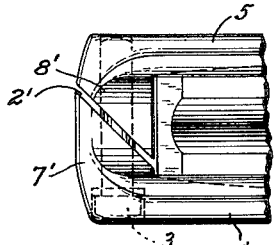
Fig. 9 is a top view of an end portion of my invention showing a modification.
Figure 4:
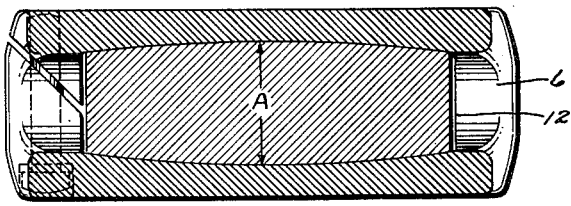
Fig. 4 is a view in section taken on the line 4—4 of Fig. 1.
Figure 7:
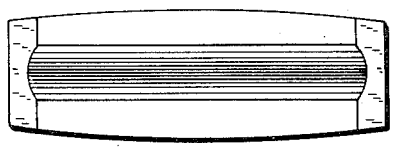
Fig. 7 is a top plan view of the insert shown in Fig. 6
Figure 8:
Fig. 8 is an end view of Fig. 6.
Figure 6:
Fig. 6 is a side view in elevation of a preferred form of insert.

In Fig. 3 I have shown the slot 2 as positioned to one side of the longitudinal center line in which case most of the entire longitudinal width of the projection 7 would contact with the trolley wire while in Fig. 9 I have shown the diagonal slot 2' as divided equally on both sides of the longitudinal center line in which case substantially one-half of the longitudinal width of the projection 7' and 8' will contact with the trolley wire and these widths of contact will equal almost the total longitudinal width of the end portion of the frame; in either case the trolley wire will be prevented from riding in the slot.

A more or less open slot is necessary from a practical standpoint since there will be some variation in the width of the recess in the frame I also a variation in the width of the insert and adjustment for this variation is provided by means of the open slot. The open slot also insures a clamping of the side walls of the frame upon the insert.

Figure 5:
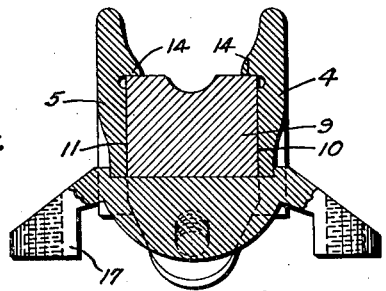
Fig. 5 is a transverse view in section taken on the line 4—4 of Fig. 1 and includes a support for the shoe.

The frame is provided with longitudinal shoulders 14 which engage with the insert 9 and assist in preventing upward displacement thereof. The recess in the holder is open on the bottom side through which the insert may be passed when the screw 3 has been loosened. The frame is provided at one end with a hook shaped portion 15 and with the threaded lug 16 at the other end by means of which the shoe may be secured to a support as set forth in my Patent 2,044,886 of which the member 17 shown in Fig. 5 forms a part.

In order to facilitate the insertion and removal of the insert through the lower side of the holder opening, I may cut away the central portion of the hook shaped portion 15, leaving as it were a pair of spaced hooks, one on each side of the holder, which I find sufficient to secure the end of the holder to its support.

Having disclosed my invention, I claim:

1. A current collector shoe comprising an elongated one-piece metal holder provided with upstanding side walls and an elongated recess therebetween, an insert positioned in the recess, the side faces of the recess being concave in a longitudinal direction and the side faces of the insert being convexed in a longitudinal direction and corresponding to the concave faces of the recess, the holder provided with a diagonal slot at one end to permit the side walls to yield relative to each other and means associated with the holder at said end to draw the sides of the holder inwardly and into engagement with the insert, the diagonal slot being so related to holder as to prevent the trolley wire riding in the opening of the slot in case the insert becomes worn through, thus decreasing wear upon the holder.

2. A current collector shoe comprising, an elongated metal holder provided with an elongated recess and a diagonal slot through one end whereby the width of the recess may be adjusted, the diagonal slot being so placed as to prevent the trolley wire riding in the opening of the slot, an insert positioned in the recess and comprising a block of current conducting material substantially filling the recess, the insert varying in width between its side faces, the maximum width being adjacent the longitudinal center of the insert, the side faces of the recess being in clamped engagement with the side faces of the insert and means adjacent the slotted end of the holder to draw the sides thereof inwardly to clamp the insert.

3. In a current collecting shoe for a trolley head, in combination, a metal holder provided with upstanding spaced flanges, a longitudinal recess formed between the flanges and having longitudinally concave side faces, a diagonal slot at one end of the holder and extending into the recess for the purpose described, an insert of current conducting material positioned in the recess and having bearing side faces to engage with and conforming in curvature to the side faces of the recess, transversely disposed means at the slotted end of the holder to draw the flanges inwardly and the aforesaid faces into engagement and means whereby the shoe may be attached to a support.

4. An insert-holder for a current collector comprising, a metallic frame provided with spaced longitudinal upstanding side walls secured together at one end and provided with a diagonal slot at the other end for the purpose described, a recess formed between the side walls to receive the insert, the side walls being laterally adjustable and transversely disposed means to draw the walls inwardly to grip the insert between the walls.

5. An insert-holder for a current collector comprising, a metallic frame provided with spaced longitudinal upstanding side walls having end walls of less height, the said walls forming an elongated recess in which an insert may be held, one end wall being slotted on a diagonal line to the longitudinal axis of the holder for the purpose described, means to draw the side walls into holding engagement with the insert and means to attach the holder to a support.

6. An insert-holder for a current collector comprising, a metallic frame provided with spaced longitudinal upstanding side walls having end walls of less height, the said walls forming an elongated recess having concave inner faces and in which an insert may be held, one end wall being slotted on a diagonal line to the longitudinal axis of the holder for the purpose described, means to draw the side walls into holding engagement with the insert and means to attach the holder to a support.

7. An insert-holder for a current collector comprising, a metallic frame provided with spaced longitudinal upstanding side walls having end walls of less height, the said walls forming an elongated recess which is wider adjacent its longitudinal center than at its ends and the side faces of the recess tapering from the point of maximum width to the ends and in which an insert may be held, one end wall being slotted on a diagonal line to the longitudinal axis of the holder for the purpose described, means to draw the side walls into holding engagement with the insert and means to attach the holder to a support.

8. An insert-holder for a current collector shoe comprising, a metallic frame having laterally adjustable upstanding side walls, and end walls of less height than the side walls, the walls forming an elongated recess in which may be held an insert, the holder provided with slotted means to permit the lateral adjustment of the side walls, the said means being diagonally disposed to the longitudinal axis of the frame so that a trolley wire contacting with the end walls will not ride in said slot and means to attach the holder to a support.

9. A current collecting device for a trolley vehicle, in combination, a one piece metal holder provided with upstanding spaced flanges, a longitudinal recess formed between the flanges, a slot through one end of the holder and extending into the recess for the purpose described, an insert of current conducting material positioned in the recess and having bearing side faces to engage with and conform to the side faces of the recess, transversely disposed means at the slotted end of the holder to draw the flanges inwardly and the side faces of the recess and the side faces of the insert into engagement, the said slot positioned in a plane obliquely disposed to the longitudinal axis of the recess, means to support the shoe and means associated with the holder whereby the holder may be attached to the support.

10. An insert-holder for a current collector comprising, a one-piece metallic frame provided with spaced longitudinal upstanding walls secured together at one end and provided with a slot at the other end to permit adjustment of the side walls, a recess formed between the walls to receive the insert, transversely disposed means to draw the walls inwardly to grip the insert between the walls, the slot positioned in a plane obliquely disposed to the longitudinal axis of the said transversely disposed means, a pair of longitudinally projecting spaced hooks at one end of the frame to interlock with means on a support and means at the other end of the frame to secure the end and the shoe to the support.

11. In a current collecting device for a trolley vehicle to collect current from a trolley wire, in combination, a metal holder provided with upstanding spaced flanges and end walls, a longitudinal recess formed between the flanges and varying in width longitudinally, a slot through one end wall of the holder and extending into the recess, an insert of current conducting material removably positioned in the recess and having bearing side faces to engage with and conforming to the side faces of the recess, the insert provided with a longitudinal groove to receive a trolley wire, transversely disposed means at the slotted end of the holder to draw the flanges inwardly and the faces of the recess into engagement with the faces of the insert, the said slot being so positioned and related to the said groove and to the transversely disposed means as to prevent the trolley wire riding in the opening of the slot in case the insert becomes worn through.

12. A current collector comprising in combination a metallic frame provided with spaced longitudinal upstanding side walls secured together at one end and provided with a diagonal slot at the other end for the purpose described, a recess formed between the side walls, a renewable insert of frangible current conducting material positioned in the recess, the side walls being laterally adjustable, transversely disposed means to draw the walls inwardly to grip the insert therebetween, means to support the frame and means associated with the frame whereby the frame may be removably secured to the support.

ERNST A. LARSSON,